United States Patent

[11] 3,565,103

[72] Inventor Joseph E. Maselek
    Rocky Hill, Conn.
[21] Appl. No. 749,201
[22] Filed July 31, 1968
[45] Patented Feb. 23, 1971
[73] Assignee The Spencer Turbine Company
    West Hartford, Conn.

[54] SOCKET AND VALVE FOR CENTRAL VACUUM SYSTEM
    7 Claims, 2 Drawing Figs.
[52] U.S. Cl. .................................................. 137/360,
    285/159, 285/212
[51] Int. Cl. .................................................. F16k 1/20,
    F16l 5/00
[50] Field of Search ....................................... 137/359,
    360, 362, 614.19; 15/301, 313, 314, 315; 251/299;
    285/7, 159, 211, 212, 220

[56]                References Cited
            UNITED STATES PATENTS
    980,418  1/1911  Hope ........................... 137/360X
  1,037,083  8/1912  Thurman ........................ 137/362
  1,096,278  5/1914  Sutton .......................... 137/359
  1,639,446  8/1927  Zannoth ........................ 137/359X
  1,717,471  6/1929  Spencer ........................ 251/299X
  2,851,286  9/1958  Bishop .......................... 137/359
  3,239,192  3/1966  Totten .......................... 285/211X Primary Examiner—Henry T. Klinksiek
Attorney—McCormick, Paulding and Huber ABSTRACT: A socket and valve structure for effecting connection between a service conduit, such as a flexible tube, and a central vacuum system having a conduit access opening disposed behind a wall opening.

The structure includes a socket body and a connected backplate which have registering openings. A valve shutter is disposed between the body and backplate normally to cover the plate opening, but it can be thrust aside to accommodate the service conduit. A connector to the system conduit opening is rotatably supported in the plate opening and can be adjusted within limits to effect connection with the system opening even though the system opening is not precisely aligned with the body and plate openings. A seal prevents air leakage around the connector in the plate opening even when there is no precise alignment.

PATENTED FEB 23 1971

3,565,103

INVENTOR.
JOSEPH E. MASELEK
BY
McCormick, Paulding & Huber
ATTORNEYS

SOCKET AND VALVE FOR CENTRAL VACUUM SYSTEM

BACKGROUND OF THE INVENTION

As can be seen from the foregoing Abstract, the present invention is in that field of art covering the coupling of a vacuum cleaner or the like, as by its flexible conduit, to a central vacuum system. Such systems generally include a plurality of wall sockets wherein such flexible conduits or other service conduits, are connected to the system. The systems are installed within the walls of buildings and have access openings or conduit openings facing toward wall openings which receive the sockets. The systems generally employ rigid piping connections, and unless the conduit openings to such piping are very carefully aligned with the wall openings, great difficulty can be involved in connecting wall sockets with the system.

SUMMARY OF THE INVENTION

In accordance with the present invention a wall socket and valve structure is provided which can be fully assembled by the manufacturer and sold with every assurance that it can easily be connected to systems outlets or conduit openings which may not be precisely aligned with the associated wall openings. The valve structure included in the socket and valve combination will function properly whether or not the system conduit opening is precisely aligned with the wall opening, and the entire structure can quickly and easily be connected to the system. When connected, the socket and valve structure provides easy access to the central vacuum system for any adapted service conduit whether it be from a vacuum cleaner or any other device using vacuum or low pressure.

DESCRIPTION OF THE PREFERRED EMBODIMENT

Figure 1:
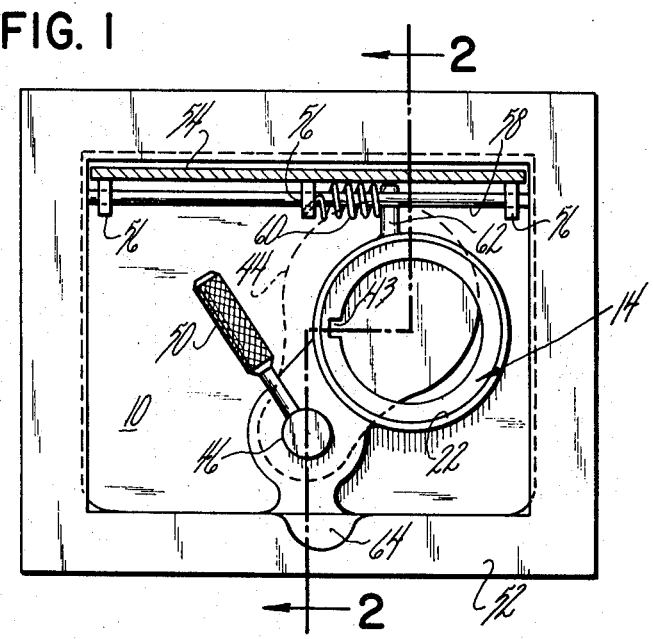
FIG. 1 is a front elevational view of a socket and valve structure provided in accordance with the present invention, showing the movable cover for the structure in an open position and in section.

As shown in the drawing, the principal elements of the structure include a socket body 10, a backplate 12, a tubular connector 14, a part of the central vacuum system 16 defining a service conduit opening 16a which is to be connected for communication with a service conduit 18 such as a flexible tube or hose extending from a vacuum cleaner or the like. That part of the vacuum system 16 defining the conduit opening 16a is disposed or located rearwardly or internally of an opening in the wall 20 of a room.

Figure 2:
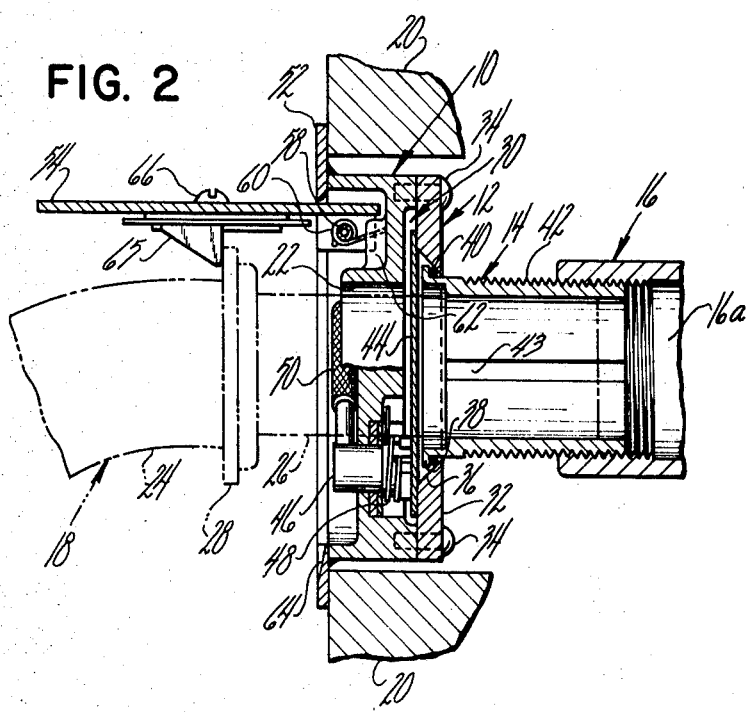
FIG. 2 is a vertical transverse sectional view on an irregular plane taken generally as indicated by the line 2–2 of FIG. 1.

As shown in FIG. 2, the socket body 10 is associated with and is preferably disposed within the opening of the wall 20. The socket body 10 defines a preferably circular opening 22 which is of sufficient size freely to receive the end portion of the service conduit 18. (Most such service conduits generally comprise a flexible hose 24 having an inserted metal tubular piece 26 extending therefrom, a flange 28 being provided on the tubular piece 26 at the end of the hose 24.) It should be noted that the opening in the wall 20 is cut so that the opening 22 in the socket body will be generally aligned with the conduit opening 16a in the vacuum system pipe 16 when the said body 10 is placed within the said wall opening or otherwise associated with it.

The back face of the socket body 10 is relieved or recessed as indicated at 30, and the said rear face and the recess 30 therein are covered by a backplate 32 which is secured to the body as by a plurality of screws 34, 34. The backplate 32 has an opening which is at least as large as the opening 22 in the body 10 and is in registry therewith, and the opening in the said backplate is defined by a forwardly diverging taper 36.

The connector 14, which may hereinafter be referred to as a "nipple" has a radially outwardly extending flange 38 which is wholly received within the radially inner and radially outer limits of the backplate taper 36, and an annular compressible "O-ring" seal is disposed between the flange 38 and the taper 36. The rearwardly extending portion of the connector or nipple 14 is externally threaded as indicated at 42 to be received by companion or complementary threads which are tapped in the conduit opening 16a. Thus, if the connector 14 is turned so that it will be threaded within the conduit opening 16a it will draw the socket backplate 12 and the socket body 10 toward the said conduit opening. When a limit of rearward movement of the backplate and body is reached, the seal 40 will be compressed. The taper 36 on the backplate 12 and the flange 38 on the connector 14 with the interposed seal 40 provide adjustment of the connector 14 off the center line of the opening 22 in the body 10 and the registering opening in the backplate 12. This permits easy assembly of the body and backplate unit to the conduit opening 16a although that opening may not be precisely aligned with the openings in the body and backplate. That is, an airtight sealed connection can be achieved despite some eccentricity and without loss of time. A longitudinally extending wrench groove 43 is provided in the bore of the connector 14 to facilitate rotating it or turning it to thread it into and out of the conduit opening 16a.

When the structure is not in use, that is, when the service conduit 18 is not inserted as shown in FIG. 2, the valve portion of the structure comes into play to close off the vacuum system conduit opening 16a The valve portion of the structure comprises a shutter 44 which is connected for pivotal movement with the rear end of a pin 46 having a forwardly projecting cylindrical portion extending through and rotatably received in a suitable opening in the body 10. The rearward portion of the pin 46 is squared off and thrust through a companion opening in the shutter 44, and a torsion spring 48 surrounds said rearwardly extending portion and is seated in the body 10 to bias the shutter 44 to a normal position wherein it covers the front face of the tapered opening 36 in the backplate 12, thus also covering or closing the conduit opening 16a. A knurled lever 50 is threaded into the forwardly projecting portion of the pin 46 for manual operating of the shutter 44 to move it aside when the service conduit is to be connected.

The socket body 10 and backplate 12 can be of such size as to be associated with the wall opening by covering said opening by covering said opening on the front or exposed surface of the wall 20. However, in the preferred embodiment shown, the body and backplate are of such size that they can be inserted or recessed within the wall opening. In this preferred embodiment, a generally rectangular face plate having a generally rectangular central opening is welded or otherwise secured to the front face of the body 10 so that it will cover only the surrounding wall opening and overlay the portion of the exposed surface of the wall adjacent thereto. It will be seen that when the connector 14 is threaded into the conduit opening 16a by use of the wrench slot 43, that the face plate 52 will be drawn into tight engagement with the exposed or front surface of the wall adjacent its opening.

Preferably, a cover 54 is provided for the central rectangular opening in the face plate 52, selectively to cover the body and associated parts or to expose them for accommodation of the service conduit 18. As shown, the rectangular cover 54 has a series of apertured lugs 56, 56 which are rotatably supported on a hinge pin 58 mounted horizontally on the body 10 near the upper end of the rectangular opening in the face plate 52. A torsion spring 60 is connected at one end to one of the lugs 56 and at the other end to an abutment 62 provided on the body 10 to bias the cover 54 downwardly or into a closed position relative to the face plate opening. A finger recess 64 is provided in the lower marginal portion of the face plate 52 to permit manual lifting of the cover to the position shown in FIGS. 1 and 2.

When the cover 54 is raised or opened as shown, a latch 65 connected as by a screw 66 to the inner face of the said cover is positioned to engage behind the service conduit flange 28 to retain the said service conduit in connected assembly or relationship with the socket body, valve and system conduit opening. The cover spring 60 biases the cover 54 downwardly or in a counterclockwise position as shown in FIG. 2 to maintain the latched condition, but the cover can easily be lifted or pivoted in a clockwise direction to effect disengagement of the service conduit.

I claim:

1. A wall socket and valve structure for connecting a service conduit to a central vacuum system having a conduit opening accessible through a wall opening from the front thereof, said structure comprising a socket body adapted to be associated with the wall opening and having an opening to receive an end portion of the service conduit, a back plate connected to the body and having an opening in substantial registry with the body opening, the plate opening having a forwardly diverging taper, a tubular connector disposed in the plate opening and having a radially outwardly extending flange on its front end received within the radially inner and outer limits of the said taper and also having means for effecting connection with the conduit opening and for drawing the plate and body toward the conduit opening, a compressible seal disposed between said flange and taper, and a manually operable valve shutter disposed between said body and plate selectively to cover the plate opening and the front end of the connector and to make them accessible to the service conduit.

2. A socket and valve structure as defined in claim 1 wherein the body is adapted to fit within the wall opening, and a face plate is secured to the body to cover only the surrounding wall opening and to engage the exposed surface of the wall adjacent thereto.

3. The structure set forth in claim 2 wherein a cover is movably mounted on said face plate selectively to cover the body in said wall opening and to be moved to a position exposing said body, the said cover being provided with means engageable with the service conduit to retain it in connection with said connector when the body is exposed.

4. The socket and valve structure defined in claim 1 wherein the means on said tubular connector for effecting connection with the conduit opening and for drawing the plate and body toward the conduit opening comprises a series of threads on the connector adapted to engage complementary threads associated with the conduit opening, and wherein said connector is provided with a wrench engaging surface to facilitate rotation of the connector in the plate opening for engagement and disengagement with the conduit opening threads.

5. The structure set forth in claim 4 wherein said valve shutter is pivotally mounted on said body by a pin extending forwardly through the body, and wherein a lever is connected to the forwardly extending end portion of said pin to provide for manual operation of the shutter.

6. The socket and valve defined in claim 5 wherein the body is adapted to fit within the wall opening, and a face plate is secured to the body to cover only the surrounding wall opening and to engage the exposed surface of the wall adjacent thereto.

7. The structure of claim 6 wherein a cover is pivotally mounted relative to said face plate selectively to cover the body and to be moved to a position exposing said body and lever, the said cover being provided with means engageable with the service conduit to retain it in connection with said connector when the body and lever are exposed.